United States Patent
Mattes et al.

(10) Patent No.: US 7,095,361 B2
(45) Date of Patent: Aug. 22, 2006

(54) RADAR SENSOR PLATFORM

(75) Inventors: Bernhard Mattes, Sachsenheim (DE); Rainer Moritz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,074

(22) PCT Filed: Mar. 16, 2002

(86) PCT No.: PCT/DE02/00971
§ 371 (c)(1),
(2), (4) Date: Apr. 16, 2003

(87) PCT Pub. No.: WO02/075354

PCT Pub. Date: Sep. 26, 2002

(65) Prior Publication Data

US 2003/0160717 A1 Aug. 28, 2003

(30) Foreign Application Priority Data

Mar. 20, 2001 (DE) .............................. 101 13 323

(51) Int. Cl.
*G01S 13/93* (2006.01)
*G01S 13/00* (2006.01)

(52) U.S. Cl. ............................ 342/70; 342/27; 342/59; 701/300; 701/301; 180/167; 180/169

(58) Field of Classification Search .............. 701/300, 701/301; 180/167–169; 342/23, 24, 27, 342/28, 59, 70, 71, 72, 118, 128–133, 175, 342/195, 73–81, 165–174
See application file for complete search history.

(56) References Cited

U.S. PATENT DOCUMENTS

| | | | | |
|---|---|---|---|---|
| 3,707,717 A | * | 12/1972 | Frielinghaus | 342/23 |
| 3,772,693 A | * | 11/1973 | Allard et al. | 342/23 |
| 4,931,930 A | * | 6/1990 | Shyu et al. | 180/167 |
| 5,274,378 A | * | 12/1993 | O'Conner | 342/23 |
| 5,432,515 A | * | 7/1995 | O'Conner | 342/23 |
| 5,572,484 A | * | 11/1996 | Gaus et al. | 180/167 |
| 5,734,336 A | * | 3/1998 | Smithline | 180/168 |
| 6,069,581 A | | 5/2000 | Li et al. | |
| 6,307,622 B1 | * | 10/2001 | Lewis | 180/169 |
| 6,326,887 B1 | * | 12/2001 | Winner et al. | 180/167 |
| 6,677,889 B1 | * | 1/2004 | Van Rees et al. | 342/23 |
| 6,707,414 B1 | * | 3/2004 | Van Rees et al. | 342/23 |

FOREIGN PATENT DOCUMENTS

| | | |
|---|---|---|
| DE | 38 13 083 | 6/1990 |
| DE | 38 44 340 | 7/1990 |
| DE | 196 16 447 | 10/1997 |
| DE | 197 55 470 | 9/1998 |
| DE | 100 11 263 | 9/2001 |

(Continued)

*Primary Examiner*—Bernarr E. Gregory
(74) *Attorney, Agent, or Firm*—Kenyon & Kenyon LLP

(57) ABSTRACT

A radar sensor platform for clearance measurement in a vehicle has at least four radar sensors, an input being entered if necessary using an input device indicating that a width measurement of a parking space is desired and the four radar sensors then enlarging their horizontal beam angle and the arrangement for acoustic and/or visual output emitting a signal as a function of the measurement of the parking space width. This signal is, for example, the parking space width or a warning. The horizontal beam angle for the parking space measurement is at least 170°. The side clearances of the vehicle in the parking space may also be displayed. Furthermore, centered parking is possible using the acoustic and visual aids. The radar sensor platform may be installed either in the front and/or rear of the vehicle.

9 Claims, 3 Drawing Sheets

FOREIGN PATENT DOCUMENTS

| | | |
|---|---|---|
| EP | 0 717 290 | 6/1996 |
| EP | 0 952 459 | 10/1999 |
| EP | 936 471 | 7/2001 |
| FR | 2716145 | 8/1995 |
| FR | 2740408 | 4/1997 |
| GB | 230955 | 7/1997 |
| WO | 91 09323 | 6/1991 |

* cited by examiner

RADAR SENSOR PLATFORM

BACKGROUND OF THE INVENTION

The present invention is directed to a radar sensor platform.

Radar sensor platforms using a 24 gigahertz pulse frequency may be used to detect objects at a short range, for precrash sensing, as a parking assistant for automatic proximity radar, for blind spot detection and for pedestrian recognition, as well as for measuring parking spaces while driving past the spaces.

German Published Patent Application No. 38 44 340 A1 describes a system which is suitable to measure a parking space. An output unit is provided which informs the driver concerning an optimally calculated path of the vehicle into the parking space and emits acoustic instructions for the new momentary steering maneuver or visual instructions. In addition, the output unit warns against collisions with parked motor vehicles on request. European Published Patent Application No. 936 471 describes an automatic changeover to a smaller observation subrange, i.e., a beam narrowing in a radar sensor platform. This occurs at roughly right angles to the side of the vehicle. British Published Patent Application No. 2309555 describes a switchover from a long-range radar having a narrow beam angle to a different sensor system, namely an ultrasonic system having a constant beam angle and short range. Furthermore, International Published Patent Application No. WO 91/09323 describes a radar system in which the beam divergence is changed as a function of speed. Moreover, German Published Patent Application No. 38 13 083 describes a calculation of data to control a parking operation.

BRIEF SUMMARY OF THE INVENTION

The radar sensor platform according to the present invention allows precise measurement of the minimum width of a parking bay or parking space. This measured result is displayed to the driver digitally. The present invention therefore eliminates subjective width estimation errors of parking spaces. Instead of a direct display, acoustic and/or visual warnings may inform a driver if the parking space is suitable for parking. The intensity of the warning may be increased if the parking space becomes increasingly narrower.

The horizontal beam angle which is used for measuring the width of a parking space may be at least 170°. This ensures an exact measurement of the parking space.

In addition, a vehicle-specific threshold value for the parking space width may be stored in a memory which may be linked to a processor wherein this threshold value together with the measured width of the parking space determines the output by the acoustic and/or visual output arrangements.

Moreover, the measured parking space width may be shown on a display so that a driver is able to utilize this information directly. It is additionally possible to expand this by also displaying the spaces next to the vehicle.

Moreover, the acoustic and visual outputs may be activated by the processor to allow centered parking. It is possible to expand this function by ensuring an optimum utilization of a parking lot by specifying distances that must be maintained from the neighboring vehicles. Finally, the radar sensor platform may be installed in at least the front or the rear of the vehicle to ensure an optimum function of the radar sensor platform.

BRIEF DESCRIPTION OF THE SEVERAL VIEWS OF THE DRAWINGS

Exemplary embodiments of the invention are illustrated in the drawing and are explained in greater detail in the following description.

DETAILED DESCRIPTION OF THE INVENTION

Since an increasing number of motor vehicles with a more or less unchanging number of available parking areas is causing optimum parking to become an increasingly more difficult undertaking, it is necessary to provide a driver with automatic assistance with parking in order to make the parking operation safer and more efficient. According to the present invention, a radar sensor platform is proposed, which is used to measure the distance of a parking space from a vehicle. Four radar sensors are used in particular in this case, the external radar sensors being used primarily to increase the horizontal beam angle to at least 170°. This is in particular advantageous for the measurement of parking spaces.

The radar sensor used in this exemplary embodiment operates at a frequency of 24 gigahertz, which is in particular suitable for short range selection since this frequency exhibits high attenuation in the atmosphere. Such radar sensors are therefore also often described as short range radar sensors. The vertical beam angle of these radar sensors is 20°. Normally, a horizontal beam angle of 140° is used for precrash sensors, for example.

Figure 1:
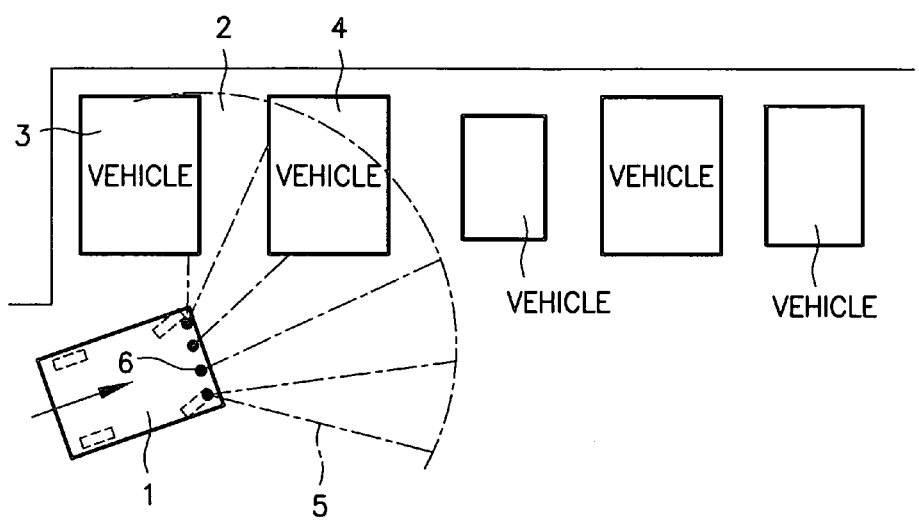
FIG. 1 is a schematic view of a parking situation.

FIG. 1 illustrates a schematic view of a parking situation. A driver of a vehicle 1, having four radar sensors 6 at the front of the vehicle, desires to park and has selected parking space 2 for this purpose. Parking space 2 is situated between parked vehicles 3 and 4. Radar sensors 6 are aligned to cover a horizontal beam angle of 170°, which is indicated by the dashed lines. The dashed lines are limited by an arc of a circle which defines the range of the radar sensors. Based on the measurement of radar sensors 6, a processor in vehicle 1 determines that parking space 2 is too narrow. Therefore it is not possible for vehicle 1 to park there. Precious time is saved and a parking attempt that might end in damage is not initiated. Both external radar sensors 6 and other radar sensors 6 in the center may be adjustable. An electronic adjustment in particular allows an increase in the beam angle, which is normally 140° for the precrash sensors, to 170°.

Figure 2:
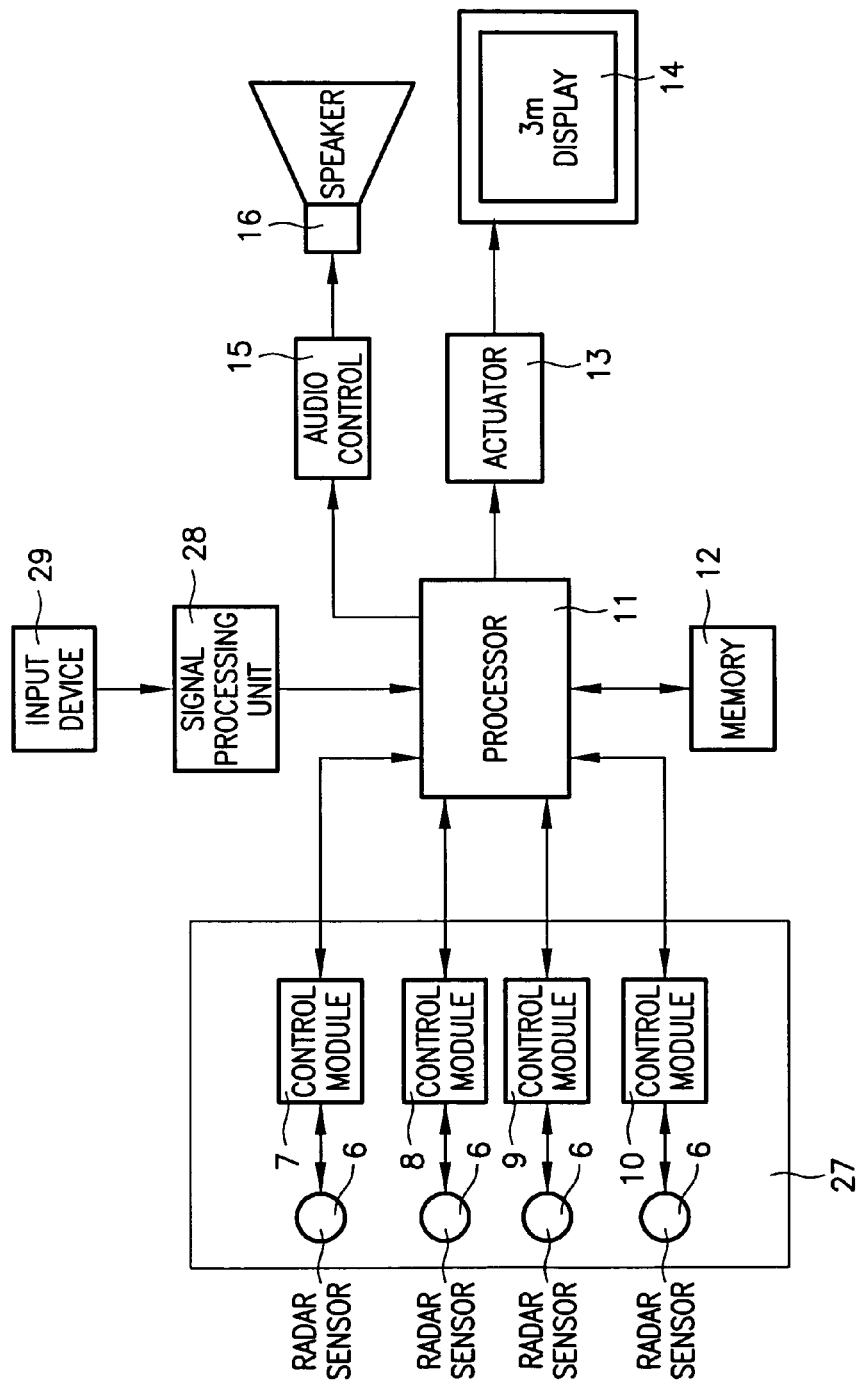
FIG. 2 is a block diagram of the radar sensor platform according to the present invention.

FIG. 2 illustrates a radar sensor platform of the present invention with connected devices as a block diagram. A radar sensor platform 27 has four radar sensors 6, to each of which control modules 7, 8, 9 and 10 are connected. These control modules 7, 8, 9 and 10 are used for both electrical and electromechanical control. Electromechanical control is, in particular, intended to change the horizontal beam angle. Electronic control includes providing the microwaves that are required for the radar sensing and also the reception of the microwaves reflected by the obstacle.

The data inputs/outputs of control modules 7, 8, 9 and 10 are connected to corresponding first, second, third, and fourth data inputs/outputs of a processor 11 via particular data inputs/outputs. A bus connection is also possible in this case. A fifth data input/output of processor 11 is connected to a memory 12, which is used for intermediate storage of results as well as a permanent memory for threshold values. A first data output of processor 11 is connected to an actuator 13, which is connected to an input of a display 14. A second data output of processor 11 is connected to an audio controller 15, which is connected to one input of a speaker 16. Controller 13 ensures that data coming from processor 11 is properly shown on a display 14. The value in this case is 3 meters. Audio controller 15 converts the signals from the processor into analog audio signals, amplifies them and then uses speaker 16 for the acoustic rendering. Processor 11 is connected via a data input to a signal processing unit 28, to which input device 29 is also connected. Input device 29 is positioned in the passenger compartment of vehicle 1 and a driver indicates an intention to measure a parking space via this input device 29. This intention is then forwarded to processor 11 via signal processing unit 28. Buttons as well as a voice control may be used as input device 29.

As a function of the inputs entered using input device 29, processor 11 activates radar sensors 6 via controllers 7, 8, 9 and 10 to increase the horizontal beam angle of radar sensors 6, if necessary, during measurement of a parking space. As a function of the measuring signals, processor 11 emits signals to the driver via display 14 and speaker 16. The pulse radar method is used for the measurement in this case. The use of a Doppler method, however, is also possible. In the pulse radar method, time that has elapsed from the instant when a pulse is sent until it returns after having been reflected by the object is measured. From this it is then possible to determine the distance to the object. The use of more than four radar sensors 6 is also possible, which will, if necessary, improve the resolution. If processor 11 has determined the parking space measured by radar sensors 6, processor 11 is able to determine therefrom the distance to vehicles 3 and 4. If the width of the parking space is smaller than the vehicle width of vehicle 1, which processor 11 determines by making a comparison with a vehicle-specific threshold value stored in memory 12, the driver is warned via speaker 16 and display 14 that it is not possible to park the parking space. If, however, the parking space is wide enough, then the driver is able to make a selection via input device 29 that he/she would like to park in the center of the space. Processor 11 then assists the driver in doing so by the measurement using radar sensors 6 and the output via speaker 16 and display 14, processor 11 instructing the driver using appropriate visual and acoustic signals that he/she must always stay in the center between vehicles 3 and 4. This creates a control loop in which the driver is the actuator mechanism and the radar sensor platform is the measuring unit.

However, the driver is also free to park in another manner, such as non-centered. In doing so, the side clearances to obstacles 3 and 4 are shown to the driver via display 14.

Figure 3:
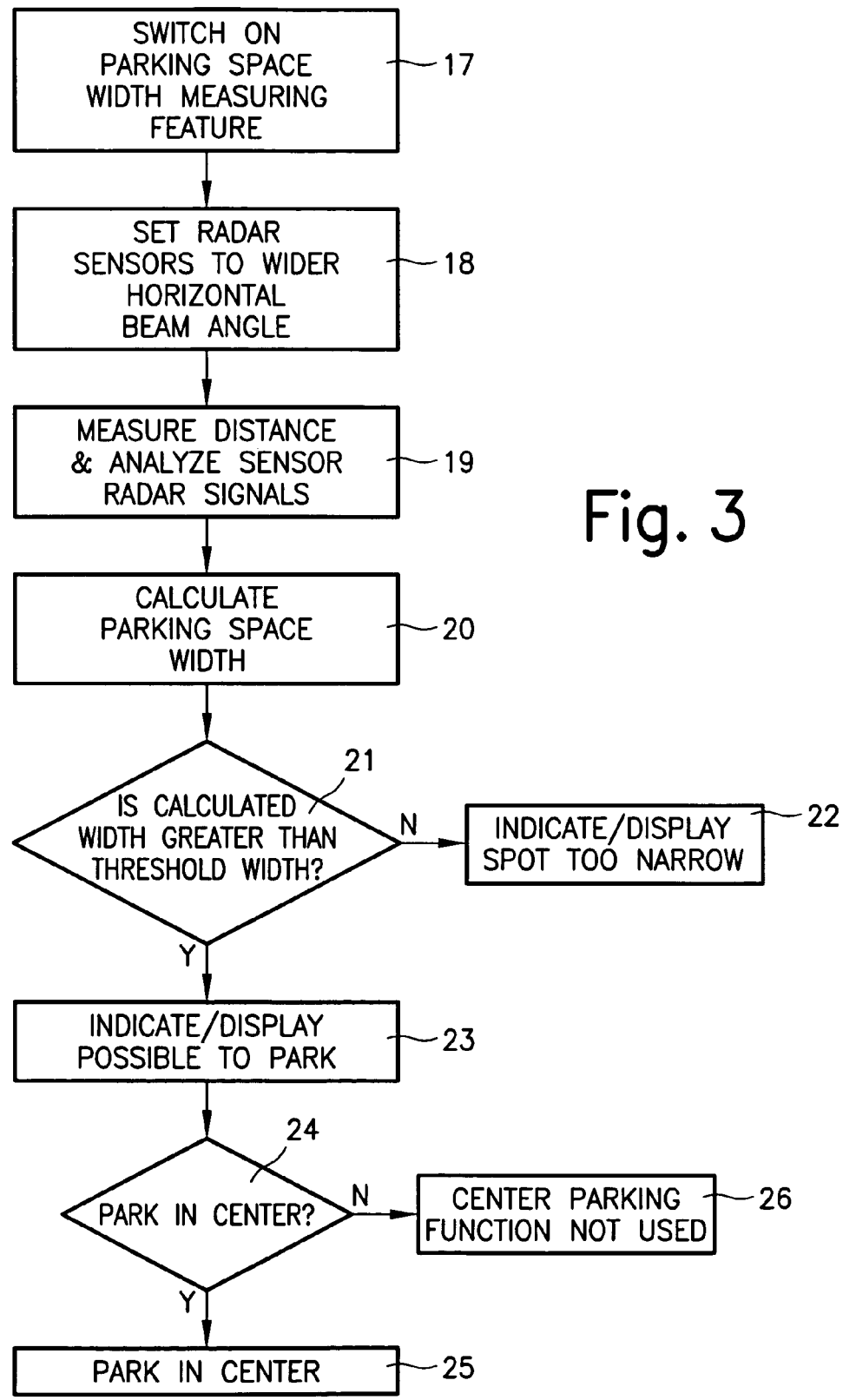
FIG. 3 is a flow diagram of a method according to the present invention.

A flow diagram of the method of the present invention is illustrated in FIG. 3. In step 17, a driver uses input device 29 to switch on the parking space width measurement. In step 18, processor 11 sets radar sensors 6 to a wider horizontal beam angle of 170° and processor 11 loads the algorithm for parking space measurement. This algorithm is located in memory 12.

The corresponding vehicle-specific threshold values indicate which parking space vehicle 1 is able to use. In step 19, radar sensors 6 measure the distances and processor 11 analyzes the radar sensor signals. The distances in the parking space are thus known. In step 20, the width of the parking space is calculated therefrom. In step 21, this width is compared with the minimum width required to park vehicle 1 using the vehicle-specific threshold value. If the width is greater than this threshold value, then a continued display in step 23 indicates that it is possible to park vehicle 1 in parking space 2. The minimum distances of 0.5 meters, for example, to vehicles 3 and 4 parked to the sides is included in the calculation. If, however, the parking space is too narrow, then it is indicated in step 22 that parking space 2 is not suitable for parking vehicle 1. In doing so, numerical data may be entered, permitting the driver to possibly attempt to park nonetheless if the vehicle fits and the side clearances to vehicles 3 and 4 are less than half a meter. In step 24, if parking is shown to be possible in step 21, a query is made whether the driver intent is to park in the center. The driver then enters this using input device 29, the driver being assisted by speaker 16 and display 14 to park in the center of the parking space in step 25. If the driver does not desire to park in the center, this function is not used in step 26. The driver is then warned of minimum distances to vehicles 3 and 4 during parking.

What is claimed is:

1. A radar sensor platform in a vehicle to perform a measurement of a parking space width, the radar sensor platform being connected to a processor that controls the outputting at least one of an acoustic warning and a visual warning, the radar sensor platform comprising:
   at least four radar sensors configured on one side of the vehicle; and
   an input device to activate the measurement of the parking space width;
   wherein in the event of the activation of the measurement of the parking space width, the at least four radar sensors are electronically adjusted to increase a horizontal beam angle as compared to another horizontal beam angle of the at least four radar sensors when used as precrash sensors, and the outputting of the at least one of the acoustic warning and the visual warning is a function of the measurement of the parking space width.

2. The radar sensor platform according to claim 1, wherein the horizontal beam angle is at least 170°.

3. The radar sensor platform according to claim 1, wherein a vehicle-specific threshold value for the parking space width is stored in a memory which is connected to the processor, and the arrangement for outputting the at least one of the acoustic warning and the visual warning emits the signal as a function of a comparison of the threshold value with the measured parking space width.

4. The radar sensor platform according to claim 1, wherein the arrangement for outputting the at least one of the acoustic warning and the visual warning includes a display configured to display the measured parking space width as the signal.

5. The radar sensor platform according to claim 4, wherein side clearances of the vehicle in a parking space are displayed.

6. The radar sensor platform according to claim 1, wherein the processor controls the arrangement for outputting the at least one of the acoustic warning and the visual warning to allow centered parking.

7. The radar sensor platform according to claim 1, wherein the radar sensor platform is installed in at least one of a front and a rear of the vehicle.

8. A system to perform a measurement of a parking space width for a vehicle, comprising:
- an input arrangement to activate the measurement; and
- at least four radar sensors arranged on one side of the vehicle, wherein in the event of the activation of the measurement of the parking space width, the at least four radar sensors are electronically adjusted to increase a horizontal beam angle as compared to another horizontal beam angle of the at least four radar sensors when used as precrash sensors, and the outputting of the at least one of the acoustic warning and the visual warning is a function of the measurement of the parking space width.

9. The system according to claim 8, wherein the system is connected to a processor to output at least one of an acoustic warning and a visual warning as a function of the measurement of the parking space width when the measurement is activated.

* * * * *

UNITED STATES PATENT AND TRADEMARK OFFICE
CERTIFICATE OF CORRECTION

| | | |
|---|---|---|
| PATENT NO. | : 7,095,361 B2 | Page 1 of 1 |
| APPLICATION NO. | : 10/296074 | |
| DATED | : August 22, 2006 | |
| INVENTOR(S) | : Bernhard Mattes et al. | |

It is certified that error appears in the above-identified patent and that said Letters Patent is hereby corrected as shown below:

Column 3, line 43 change "he/she would like to park" to --he would like to park--

Column 3, line 48 change "he/she must always stay" to --he must always stay--

Signed and Sealed this

Seventeenth Day of June, 2008

JON W. DUDAS
*Director of the United States Patent and Trademark Office*